US012430622B2

(12) United States Patent
Iwata

(10) Patent No.: US 12,430,622 B2
(45) Date of Patent: Sep. 30, 2025

(54) CRYPTOCURRENCY PAYMENT SUPPORT APPARATUS, CRYPTOCURRENCY PAYMENT SUPPORT SYSTEM, CRYPTOCURRENCY PAYMENT SUPPORT METHOD, AND NON-TRANSITORY RECORDING MEDIUM

(71) Applicant: GURUNAVI, INC., Tokyo (JP)

(72) Inventor: Shinji Iwata, Tokyo (JP)

(73) Assignee: GURUNAVI, INC., Tokyo (JP)

(*) Notice: Subject to any disclaimer, the term of this patent is extended or adjusted under 35 U.S.C. 154(b) by 0 days.

(21) Appl. No.: 16/761,975

(22) PCT Filed: Nov. 7, 2017

(86) PCT No.: PCT/JP2017/040147
§ 371 (c)(1),
(2) Date: May 6, 2020

(87) PCT Pub. No.: WO2019/092795
PCT Pub. Date: May 16, 2019

(65) Prior Publication Data
US 2020/0265391 A1    Aug. 20, 2020

(51) Int. Cl.
*G06Q 20/06*    (2012.01)
*G06K 19/06*    (2006.01)
(Continued)

(52) U.S. Cl.
CPC ..... *G06Q 20/065* (2013.01); *G06K 19/06009* (2013.01); *G06Q 20/3678* (2013.01); *H04W 4/80* (2018.02); *G06Q 2220/00* (2013.01)

(58) Field of Classification Search
CPC ................ G06Q 20/065; H04W 4/30
See application file for complete search history.

(56) References Cited

U.S. PATENT DOCUMENTS 8,712,920 B2*  4/2014  Walker .................. G06Q 20/24
                                                          705/40
8,924,269 B1*  12/2014  Seubert ................. G06Q 40/00
                                                          705/35
(Continued)

FOREIGN PATENT DOCUMENTS

JP    2001-256409 A    9/2001
JP    2001-344548 A    12/2001
(Continued)

OTHER PUBLICATIONS

International Search Report for PCT/JP2017/040147 dated Jan. 23, 2018 [PCT/ISA/210].
(Continued)

*Primary Examiner* — Daniel S Felten
(74) *Attorney, Agent, or Firm* — Sughrue Mion, PLLC

(57) ABSTRACT

An apparatus includes an acquisition processing circuit and an identification processing circuit. The acquisition processing circuit acquires first exchange information, second exchange information, and fee information, the first exchange information allowing identification of a first exchange where a first user has an account, among exchanges that deal with cryptocurrencies, the second exchange information allowing identification of, among the exchanges, second exchanges where a second user has accounts, the fee information including information about remittance fees that are required for cryptocurrency remittances among the exchanges. The identification processing circuit identifies, among the second exchanges, a second exchange that requires a lowest remittance fee for remittance with the first exchange, based on the first exchange information, the second exchange information, and the fee information.

3 Claims, 15 Drawing Sheets

(51) Int. Cl.
    *G06Q 20/36*     (2012.01)
    *H04W 4/80*     (2018.01)

(56) References Cited

U.S. PATENT DOCUMENTS

| | | | |
|---|---|---|---|
| 11,068,885 B2* | 7/2021 | Robins | G06Q 40/02 |
| 11,222,298 B2* | 1/2022 | Abelow | G06Q 10/067 |
| 2002/0004760 A1 | 1/2002 | Yoshida et al. | |
| 2017/0161729 A1 | 6/2017 | Wang | |
| 2018/0247191 A1* | 8/2018 | Katz | G06V 40/16 |
| 2018/0268395 A1 | 9/2018 | Donk et al. | |
| 2019/0095995 A1* | 3/2019 | Rohlfs | G06Q 40/04 |
| 2020/0342424 A1* | 10/2020 | Friedlander | G06Q 20/065 |
| 2021/0090166 A1* | 3/2021 | Bayne | G06Q 20/3825 |
| 2021/0158443 A1* | 5/2021 | Kilgore | G06Q 20/10 |
| 2021/0182805 A1* | 6/2021 | Benkreira | G06Q 20/387 |

FOREIGN PATENT DOCUMENTS

| | | | | |
|---|---|---|---|---|
| JP | 2002-329157 A | 11/2002 | | |
| JP | 6082830 B1 | 2/2017 | | |
| JP | 2017-054339 A | 3/2017 | | |
| WO | 2017/052365 A1 | 3/2017 | | |
| WO | WO-2019216602 A1 * | 11/2019 | | G06Q 20/36 |
| WO | WO-2020175312 A1 * | 9/2020 | | H04L 9/3247 |
| WO | WO-2021210918 A1 * | 10/2021 | | H04L 9/50 |
| WO | WO-2022102066 A1 * | 5/2022 | | G06Q 20/06 |

OTHER PUBLICATIONS

Written Opinion for PCT/JP2017/040147 dated Jan. 23, 2018 [PCT/ISA/237].

Sakurai Allegus, "The introduction to the Super-Drawing Block Chain", first edition, Japan , JMA Management Center Nagawa, Jan. 30, 2017, pp. 140-145 (9 pages total).

Office Action dated Feb. 15, 2022 from the Japanese Patent Office in JP Application No. 2019-551795.

* cited by examiner

| USER ID INFO | REMITTANCE DESTINATION EXCHANGE | CRYPTOCURRENCY TYPE |
|---|---|---|
| 1234567891 | AAA | Bitcoin |
| 1234567892 | AAA | Bitcoin |
|  | BBB | Bitcoin |
| 1234567893 | CCC | Bitcoin |
|  | DDD | Ripple |

| SHOP ID INFO | REMITTANCE DESTINATION EXCHANGE | CRYPTOCURRENCY TYPE |
|---|---|---|
| 9876543211 | AAA | Bitcoin |
| 9876543212 | AAA | Bitcoin |
|  | BBB | Bitcoin |
| 9876543213 | CCC | Bitcoin |
|  | DDD | Ripple |

CRYPTOCURRENCY PAYMENT SUPPORT APPARATUS, CRYPTOCURRENCY PAYMENT SUPPORT SYSTEM, CRYPTOCURRENCY PAYMENT SUPPORT METHOD, AND NON-TRANSITORY RECORDING MEDIUM

CROSS REFERENCE TO RELATED APPLICATIONS

This application is a National Stage of International Application No. PCT/JP2017/040147 filed Nov. 7, 2017, the entire contents of which is herein incorporated by reference in its entirety.

BACKGROUND OF THE INVENTION

Field of the Invention

The present invention relates to a cryptocurrency payment support apparatus, a cryptocurrency payment support system, a cryptocurrency payment support method, and a non-transitory recording medium for managing payments by cryptocurrencies.

Description of Related Art

In recent years, at facilities such as restaurants and electronics retail stores, a payment method using a cryptocurrency such as Bitcoin may be adopted, as well as payment methods using cash or a credit card.

SUMMARY OF THE INVENTION

Problem to be Solved by the Invention

Meanwhile, the payment by the cryptocurrency is made via cryptocurrency exchanges (hereinafter merely referred to as "exchanges"). In such payments, a remittance fee may be charged when an exchange of the payer's account is different from an exchange of the payee's account. In addition, the payer may be required to select a payment destination account from a plurality of accounts owned by the payee in a plurality of exchanges. However, it is difficult for the payer or the payee to grasp all remittance fees required between the payer's account and the plurality of accounts of the payee. Accordingly, there is a problem that the payer cannot easily select an account that requires the lowest remittance fee.

An object of the present invention is to provide a cryptocurrency payment support apparatus, a cryptocurrency payment support system, a cryptocurrency payment support method, and a cryptocurrency payment support program that support an easy selection of an exchange that restricts a remittance fee in a cryptocurrency payment.

Means for Solving the Problem

A first aspect of the present invention relates to a cryptocurrency payment support apparatus including: an acquisition processing unit configured to acquire first exchange information, second exchange information, and fee information, the first exchange information allowing identification of a first exchange where a first user has an account, among a plurality of exchanges that deal with cryptocurrencies, the second exchange information allowing identification of, among the plurality of exchanges, a plurality of second exchanges where a second user has accounts, the fee information including information about remittance fees that are required for cryptocurrency remittances among the plurality of exchanges; and an identification processing unit configured to identify, among the plurality of second exchanges, a second exchange that requires a lowest remittance fee for remittance with the first exchange, based on the first exchange information, the second exchange information, and the fee information.

A second aspect of the present invention relates to a cryptocurrency payment support system including: an acquisition processing unit configured to acquire first exchange information, second exchange information, and fee information, the first exchange information allowing identification of a first exchange where a first user has an account, among a plurality of exchanges that deal with cryptocurrencies, the second exchange information allowing identification of a plurality of second exchanges where a second user has accounts, the fee information including information about remittance fees that are required for cryptocurrency remittances among the plurality of exchanges; an identification processing unit configured to identify, among the plurality of second exchanges, a second exchange that requires a lowest remittance fee for remittance with the first exchange, based on the first exchange information, the second exchange information, and the fee information; and a payment processing unit configured to remit cryptocurrency from the account of the first user of the first exchange to an account of the second user of the second exchange identified by the identification processing unit.

A third aspect of the present invention relates to a cryptocurrency payment support method in which a computer executes: an acquisition step of acquiring first exchange information, second exchange information, and fee information, the first exchange information allowing identification of a first exchange where a first user has an account, among a plurality of exchanges that deal with cryptocurrencies, the second exchange information allowing identification of a plurality of second exchanges where a second user has accounts, the fee information including information about remittance fees that are required for cryptocurrency remittances among the plurality of exchanges; and a step of identifying, among the plurality of second exchanges, a second exchange that requires a lowest remittance fee for remittance with the first exchange, based on the first exchange information, the second exchange information, and the fee information.

A fourth aspect of the present invention relates to a non-transitory computer-readable recording medium on which is recorded a cryptocurrency payment support program for causing a computer to execute: an acquisition step of acquiring first exchange information, second exchange information, and fee information, the first exchange information allowing identification of a first exchange where a first user has an account, among a plurality of exchanges that deal with cryptocurrencies, the second exchange information allowing identification of a plurality of second exchanges where a second user has accounts, the fee information including information about remittance fees that are required for cryptocurrency remittances among the plurality of exchanges; and a step of identifying, among the plurality of second exchanges, a second exchange that requires a lowest remittance fee for remittance with the first exchange, based on the first exchange information, the second exchange information, and the fee information.

Effects of the Invention

The above aspects of the present invention provide a cryptocurrency payment support apparatus, a cryptocurrency payment support system, a cryptocurrency payment support method, and a non-transitory recording medium that support an easy selection of an exchange that restricts a remittance fee in a cryptocurrency payment.

BRIEF DESCRIPTION OF THE DRAWINGS

FIG. 12 is a diagram showing an example of first correspondence information used in the cryptocurrency payment support system according to an embodiment of the present invention.

FIG. 13 is a diagram showing an example of second correspondence information used in the cryptocurrency payment support system according to an embodiment of the present invention.

DETAILED DESCRIPTION OF EMBODIMENTS

The following describes embodiments of the present invention with reference to the accompanying drawings. It should be noted that the following embodiments are examples of specific embodiments of the present invention and should not limit the technical scope of the present invention.

First Embodiment

First, a description is given of a cryptocurrency payment support system according to a first embodiment of the present invention.

[Cryptocurrency Payment Support System 100]

Figure 1:
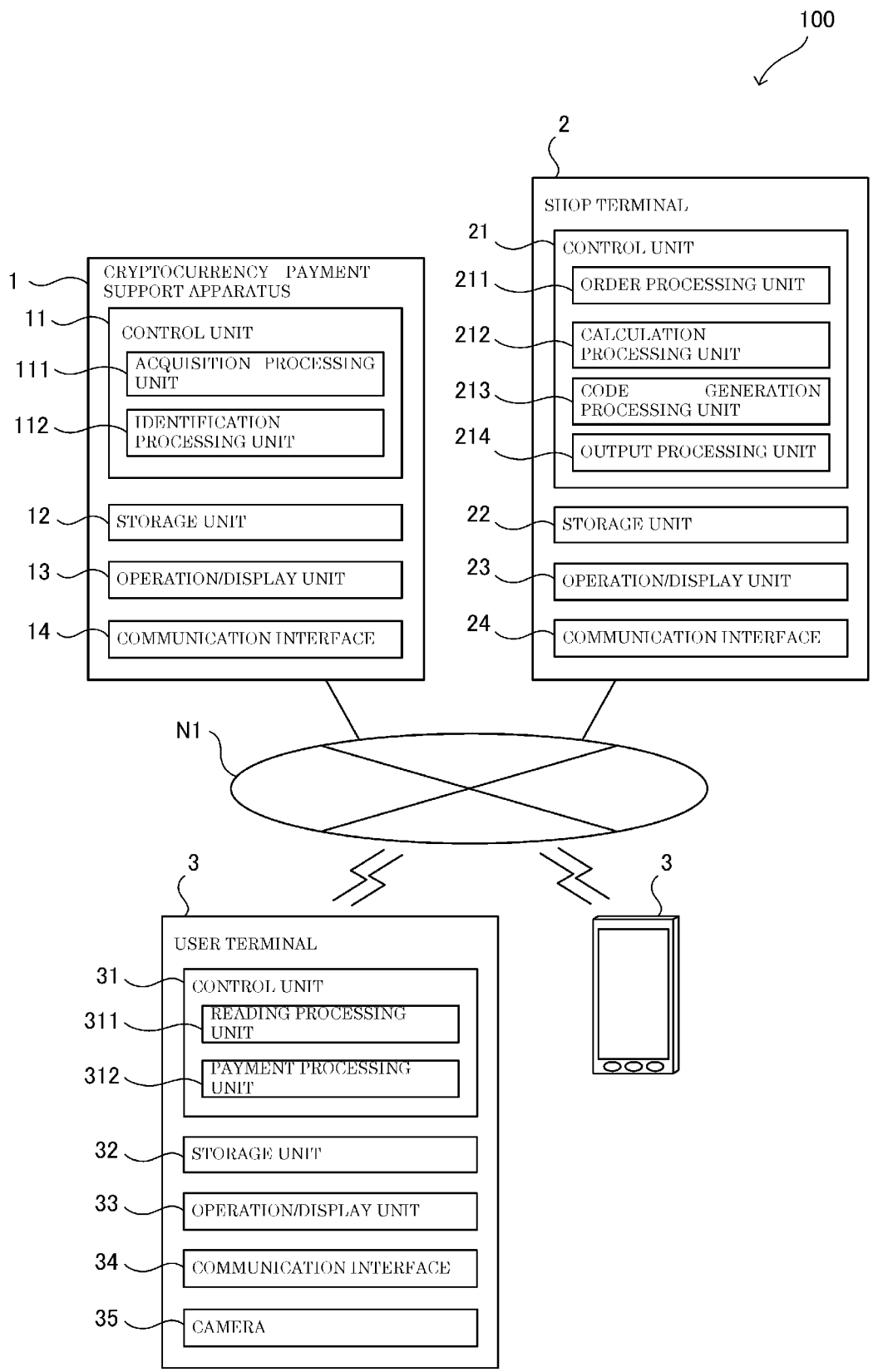
FIG. 1 is a block diagram showing a configuration of a cryptocurrency payment support system according to an embodiment of the present invention.

As shown in FIG. 1, a cryptocurrency payment support system 100 includes a cryptocurrency payment support apparatus 1, a shop terminal(s) 2, and a user terminal(s) 3. In the present embodiment, a user who is the owner of the user terminal 3 is an example of a first user, and the user terminal 3 is an example of a first user terminal. In addition, a restaurant to which the shop terminal 3 is set is an example of a second user, and the shop terminal 2 is an example of a second user terminal.

The cryptocurrency payment support apparatus 1, the shop terminal 2, and the user terminal 3 can communicate with each other via a communication network N1 such as the Internet, a LAN, a WAN, or a public telephone line. In addition, the cryptocurrency payment support apparatus 1, the shop terminal 2, and the user terminal 3 may communicate with each other in accordance with a short-range wireless communication standard such as the NFC (Near Field Communication) or Bluetooth (registered trademark).

[Cryptocurrency Payment Support Apparatus 1]

The cryptocurrency payment support apparatus 1 has a function to support a payment using a cryptocurrency for a usage fee of a facility such as a restaurant, in response to a request from a user of the facility. It is noted that the cryptocurrencies include, for example, Bitcoin, Ethereum, and Ripple.

In the following description, it is supposed that the facility is a restaurant, and the usage fee of the facility is a charge for food and drink at the restaurant. It is noted however that the present invention is not limited to a payment for a charge for food and drink at a restaurant, but is applicable to a variety of payments at a variety of facilities, such as a payment for an accommodation charge of an accommodation facility, and a payment for a play fee of a golf coarse. In addition, not limited to payments at such facilities, the present invention is applicable to, for example, a payment for a net shop or a net service on the Internet.

Meanwhile, the payment by the cryptocurrency is made via cryptocurrency exchanges (hereinafter merely referred to as "exchanges"). In such payments, a remittance fee may be charged when an exchange of the payer's account is different from an exchange of the payee's account. In addition, the payer may be required to select a payment destination account from a plurality of accounts owned by the payee in a plurality of exchanges. However, it is difficult for the payer or the payee to grasp all remittance fees required between the payer's account and the plurality of accounts of the payee, and thus the payer cannot easily select an account that requires the lowest remittance fee. On the other hand, as described below, the cryptocurrency payment support system 100 according to the present embodiment is configured to support an easy selection of an exchange that restricts a remittance fee in a cryptocurrency payment.

As shown in FIG. 1, the cryptocurrency payment support apparatus 1 is a server computer that includes a control unit 11, a storage unit 12, an operation/display unit 13, and a communication interface 14. It is noted that the cryptocurrency payment support apparatus 1 is not limited to a computer, but may be a computer system in which a plurality of computers cooperatively work together. In addition, various types of processes executed in the cryptocurrency payment support apparatus 1 may be executed by a plurality of processors by distribution.

The communication interface 14 is configured to connect the cryptocurrency payment support apparatus 1 to the communication network N1 wirelessly or with cable, and execute a data communication with external devices such as the shop terminal 2 and the user terminal 3 via the communication network N1 in accordance with a predetermined communication protocol.

The operation/display unit 13 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

Figure 2:
FIG. 2 is a diagram showing an example of fee information used in the cryptocurrency payment support system according to an embodiment of the present invention.

The storage unit 12 is a nonvolatile storage unit such as a semiconductor memory, a HDD (Hard Disk Drive) or a SSD (Solid State Drive) that stores various types of information. Specifically, data such as fee information D1 is stored in the storage unit 12. Here, FIG. 2 is a diagram showing an example of the fee information D1.

The fee information D1 includes information about remittance fees that are required for cryptocurrency remittances among a plurality of exchanges that deal with cryptocurrency transactions. Specifically, the fee information D1 stores remittance fees that respectively correspond to combinations of a remittance source exchange, a remittance destination exchange, and a cryptocurrency type. For example, the remittance fee is "0" (zero) when the remittance source exchange is "exchange AAA", the remittance destination exchange is also "exchange AAA", and the cryptocurrency type is "bitcoin". On the other hand, the remittance fee is "0.00005 BTC" when the remittance source exchange is "exchange AAA", the remittance destination exchange is "exchange BBB" different from the remittance source exchange, and the cryptocurrency type is "bitcoin". It is noted that the fee information D1 is preliminarily registered in the storage unit 12 by the manager of the cryptocurrency payment support apparatus 1, and updated as necessary. In addition, the fee information D1 may be automatically downloaded at a predetermined timing from a specific server by the control unit 11, and updated. It is noted that the remittance fee may be a minus value. In addition, the fee information D1 may include return information that indicates an amount of money or points to be returned to a user when an exchange is used by the user.

Furthermore, control programs such as a cryptocurrency payment support program are stored in the storage unit 12, wherein the cryptocurrency payment support program causes the control unit 11 to execute a payment support process (see FIG. 3) that is described below. For example, the cryptocurrency payment support program is recorded on a non-transitory computer-readable recording medium such as a CD or a DVD, and is read from the recording medium by a reader (not shown) such as a CD drive or a DVD drive provided in the cryptocurrency payment support apparatus 1, and the cryptocurrency payment support program is stored in the storage unit 12.

The control unit 11 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of calculation processes are stored in advance. The RAM is a volatile or nonvolatile storage unit that is used as a temporary storage memory (working area) for the various types of processes executed by the CPU. The control unit 11 controls the cryptocurrency payment support apparatus 1 by causing the CPU to execute various types of control programs that have been stored in the ROM or the storage unit 12 in advance.

Specifically, as shown in FIG. 1, the control unit 11 includes various processing units such as an acquisition processing unit 111 and an identification processing unit 112. It is noted that the control unit 11 functions as the various processing units when it causes the CPU to execute various processes in accordance with the cryptocurrency payment support program. In addition, a part or all of the processing units of the control unit 11 may be provided as an electronic circuit. It is noted that the cryptocurrency payment support program may be a program for functioning a plurality of processors as the various processing units.

The acquisition processing unit 111 executes a process for acquiring the fee information D1, first exchange information, and second exchange information. Specifically, the acquisition processing unit 111 acquires the fee information D1 by reading the fee information D1 from the storage unit 12. Here, in the present embodiment, it is supposed that the fee information D1 is stored in the cryptocurrency payment support apparatus 1. On the other hand, the fee information D1 may be stored in another server apparatus or the like on the condition that the cryptocurrency payment support apparatus 1 can acquire the fee information D1 therefrom via the communication network N1 or the like.

In addition, the acquisition processing unit 111 acquires the first exchange information and the second exchange information by extracting them from an identification processing request that is transmitted from the user terminal 3, wherein the identification processing request is described below.

The first exchange information is concerned with, among a plurality of exchanges that deal with cryptocurrencies, an exchange (hereinafter referred to as a "first exchange") in which the user of the user terminal 3 has an account. Specifically, the first exchange information includes, in association with the account in the first exchange: first exchange identification information for identifying the first exchange; and information of one or more types of cryptocurrencies that can be dealt with in the first exchange.

The second exchange information is concerned with, among the plurality of exchanges that deal with cryptocurrencies, one or more exchanges (hereinafter referred to as "second exchanges") in which a restaurant where the shop terminal 2 is installed has an account. Specifically, the second exchange information includes: second exchange identification information for identifying the second exchanges; and information indicating the types of cryptocurrencies that can be dealt with in the second exchanges.

The identification processing unit 112 identifies, among the second exchanges, a second exchange that requires the lowest remittance fee for the remittance with the first exchange. It is noted that when two or more second exchanges require the lowest remittance fee, a second exchange having the highest priority among them may be selected, wherein priorities are assigned to the plurality of second exchanges in advance.

As another embodiment, a part or all of the acquisition processing unit 111 and the identification processing unit 112 may be provided in the shop terminal 2 or the user terminal 3.

[Shop Terminal 2]

As shown in FIG. 1, the shop terminal 2 includes a control unit 21, a storage unit 22, an operation/display unit 23, and a communication interface 24. The shop terminal 2 is installed in a restaurant, and operated by the staff of the restaurant. The shop terminal 2 is an information processing apparatus such as a mobile phone, a smartphone, a tablet terminal, or a personal computer. For example, a stationary terminal (a register terminal) and a plurality of portable terminals (order entry terminals) carried by the staff, may be provided in the restaurant as the shop terminal 2.

The communication interface 24 is configured to connect the shop terminal 2 to the communication network N1 wirelessly or with cable, and execute a data communication with external devices such as the cryptocurrency payment support apparatus 1 via the communication network N1 in accordance with a predetermined communication protocol.

The operation/display unit 23 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 22 is a nonvolatile storage unit such as a flash memory that stores various types of information. For example, control programs such as a shop terminal program are stored in the storage unit 22, wherein the shop terminal program causes the control unit 21 to execute a shop terminal process (see FIG. 7) that is described below. For example, the shop terminal program is recorded on a non-transitory computer-readable recording medium such as a CD or a DVD, and is read from the recording medium by a reader (not shown) such as a CD drive or a DVD drive which is electrically connected to the shop terminal 2, and the shop terminal program is stored in the storage unit 22. In addition, the storage unit 22 stores order history information (not shown) that indicates a list of foods and drinks ordered for each table placed in the restaurant, and amounts of money.

Furthermore, the storage unit 22 stores second exchange information that is concerned with exchanges in which restaurants have accounts for receiving the cryptocurrencies. That is, the storage unit 22 is an example of a first storage unit. For example, the second exchange information is stored in the storage unit 22 in response to a user operation performed on the shop terminal 2. The second exchange information includes exchange identification information, cryptocurrency type information, and address information. The exchange identification information indicates IDs or names of the exchanges. The cryptocurrency type information indicates types of cryptocurrencies that can be received at the accounts of the exchanges. The address information indicates addresses of the accounts of the exchanges to which the cryptocurrencies are remitted.

The control unit 21 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of calculation processes are stored in advance. The RAM is a volatile or nonvolatile storage unit for storing various types of information, and is used as a temporary storage memory (working area) for the various types of processes executed by the CPU. The control unit 21 controls the shop terminal 2 by causing the CPU to execute various types of control programs that have been stored in the ROM or the storage unit 22 in advance.

Specifically, the control unit 21 includes various types of processing units such as an order processing unit 211, a calculation processing unit 212, a code generation processing unit 213, and an output processing unit 214. It is noted that the control unit 21 functions as the various types of processing units when it causes the CPU to execute various programs in accordance with the shop terminal program. In addition, a part or all of the processing units of the control unit 21 may be provided as an electronic circuit. It is noted that the shop terminal program may be a program for functioning a plurality of processors as the various types of processing units.

The order processing unit 211 stores orders received from users as the order history information, for each table in the restaurants. It is noted that the orders from users are input by the staff via, for example, the operation/display unit 23 of the shop terminal 2. Alternatively, the orders from users may be input by the staff via order entry terminals carried by the staff.

The calculation processing unit 212 calculates a charge amount of a real currency (cash) such as Japanese yen for the users at the tables, based on the order history information received by the order processing unit 211 and stored. In addition, the calculation processing unit 212 is configured to acquire a rate between a real currency and a cryptocurrency from a specific web site that manages rates of the various types of cryptocurrencies, and calculate an amount of cryptocurrency corresponding to the charge amount.

The output processing unit 213 outputs code information such as a two-dimensional code that includes: information of a charge amount calculated by the calculation processing unit 212; and the second exchange information. Specifically, the output processing unit 213 displays the code information on the operation/display unit 23. It is noted that in the restaurant, a table top order terminal (not shown) may be provided for each user or each group of users. In this case, the output processing unit 213 may display the code information on the table top order terminal (not shown) provided for each user or each group of users. The user can read the code information displayed on the table top order terminal by using the user terminal 3. It is noted that in a case where the code information is displayed on the table top order terminal, the output processing unit 213 may display the code information on the table top order terminal in response to a specific operation (for example, operation of a "Pay" button) performed by the user.

The code information is not limited to the two-dimensional code, but may be, for example, a one-dimensional code such as a bar code, or an alphanumeric code (exchange code). Furthermore, the code information may include, for example, shop identification information, table number, slip number, and shop entry date/time, in addition to the information of charge amount to user, and the second exchange information.

It is noted that as another embodiment, a part or all of the order processing unit 211, the calculation processing unit 212, the code generation processing unit 213, and the output processing unit 214 may be provided in the cryptocurrency payment support apparatus 1.

[User Terminal 3]

As shown in FIG. 1, the user terminal 3 includes a control unit 31, a storage unit 32, an operation/display unit 33, a communication interface 34, and a camera 35. The user terminal 3 is a mobile terminal owned by a user of a restaurant, and is, for example, an information processing apparatus such as a smartphone, a mobile phone, or a tablet terminal.

The camera 35 is a digital camera configured to capture an image of an object and output the captured image as image data. In the user terminal 3, the camera 35 is used to read the code information.

The communication interface 34 is configured to connect the user terminal 3 to the communication network N1 wirelessly or with cable, and execute a data communication with external devices such as the cryptocurrency payment support apparatus 1 via the communication network N1 in accordance with a predetermined communication protocol.

The operation/display unit 33 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 32 is a nonvolatile storage unit such as a flash memory that stores various types of information. For example, control programs such as a user terminal program are stored in the storage unit 32, wherein the user terminal program causes the control unit 31 to execute a user terminal process (see FIG. 5) that is described below. For example, the user terminal program is recorded on a non-transitory computer-readable recording medium such as a CD or a DVD, and is read from the recording medium by a reader (not shown) such as a CD drive or a DVD drive that is electrically connected to the user terminal 3, and the user terminal program is stored in the storage unit 32.

Furthermore, the storage unit 32 stores first exchange information that is concerned with exchanges in which users have accounts that can be used as remittance source accounts for remitting the cryptocurrencies. That is, the storage unit 32 is an example of a second storage unit. For example, the first exchange information is stored in the storage unit 32 in response to a user operation performed on the user terminal 3.

The control unit 31 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of processes are stored in advance. The RAM is a volatile or nonvolatile storage unit that is used as a temporary storage memory (working area) for the various types of processes executed by the CPU. The control unit 31 controls the user terminal 3 by causing the CPU to execute various types of control programs that have been stored in the ROM or the storage unit 32 in advance.

Specifically, the control unit 31 includes various types of processing units such as a reading processing unit 311 and a payment processing unit 312. It is noted that the control unit 31 functions as the various types of processing units when it causes the CPU to execute various programs in accordance with the user terminal program. For example, the user terminal program executes a predetermined process by using cryptocurrency management software provided from the first exchange. In addition, a part or all of the processing units of the control unit 31 may be provided as an electronic circuit. It is noted that the user terminal program may be a program for functioning a plurality of processors as the various types of processing units.

The reading processing unit 311, when the code information is included in the digital image captured by the camera 35, reads information of a charge amount, the second exchange information or the like from the code information.

The payment processing unit 312 executes a payment process of remitting an amount of cryptocurrency corresponding to the charge amount, to, as the remittance destination, any one of accounts indicated by the second exchange information. For example, for the execution of the payment process, cryptocurrency management software provided from the first exchange is used.

[User Terminal Process]

Figure 3:
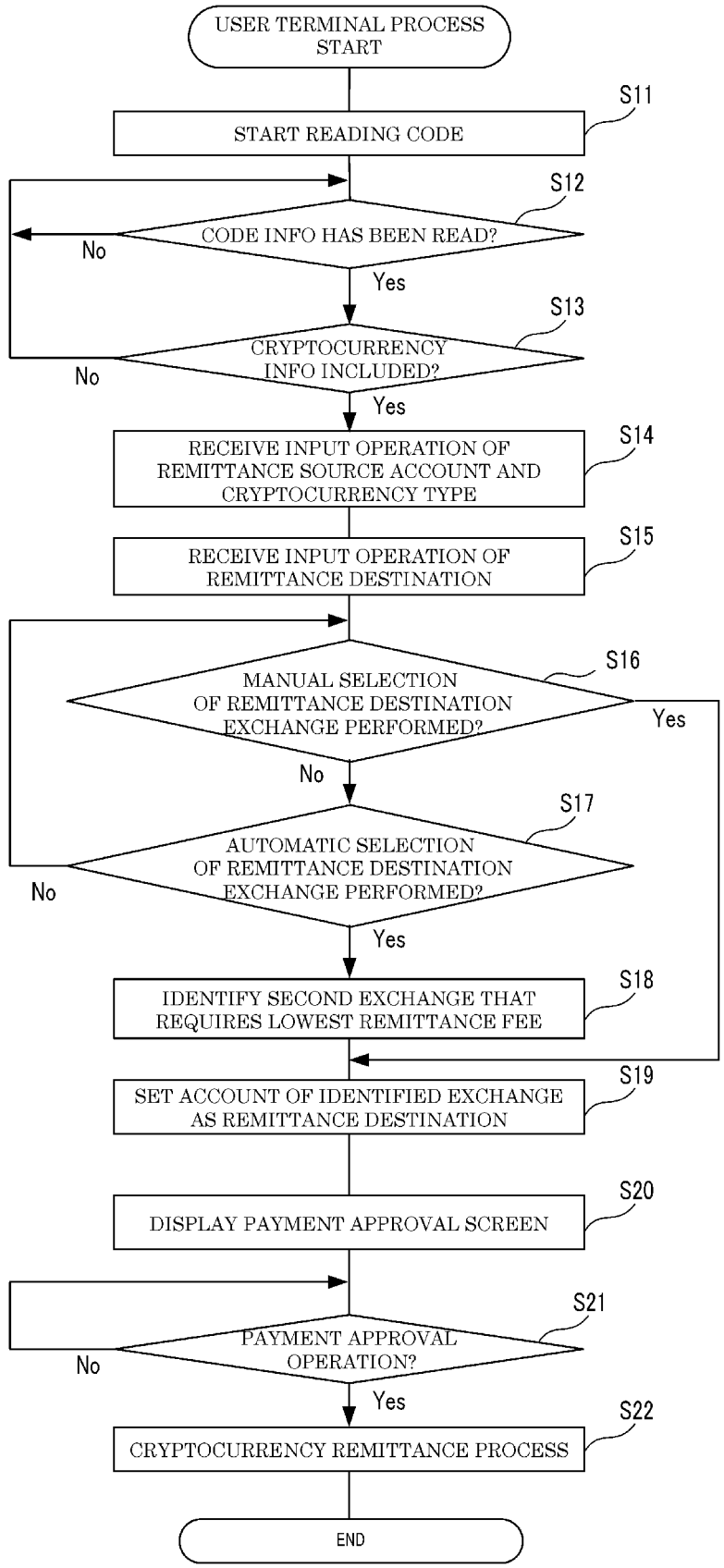
FIG. 3 is a flowchart showing an example of a procedure of a user terminal process executed in a user terminal of the cryptocurrency payment support system according to an embodiment of the present invention.

The following describes the user terminal process executed by the control unit 31 of the user terminal 3, with reference to FIG. 3. For example, in response to a user operation performed to request a cryptocurrency payment, the control unit 31 starts to execute the user terminal process in accordance with the user terminal program. It is noted that the user terminal process may be ended halfway in response to a predetermined operation performed on the user terminal 3.

Although there may be cases where, in addition to the cryptocurrency payment, electronic payments such as a credit card payment are available in the user terminal 3, description of such cases is omitted. For example, when the cryptocurrency payment is selected from a plurality of payment methods by a user operation, the control unit 31 starts the user terminal process, and when another payment method is selected, the control unit 31 starts a process corresponding to the selected payment method.

In addition, the present invention can be considered as a cryptocurrency payment support method that executes one or more steps included in the user terminal process, a payment support process described below, and a shop terminal process described below. It is noted that one or more steps included in the user terminal process described here may be omitted as necessary. In addition, the steps constituting the user terminal process may be executed in a different order as far as the same action and effect are produced. Furthermore, although the present embodiment describes an example case where the steps constituting the user terminal process are executed by the control unit 31, in another embodiment, the steps may be executed by a plurality of processors by distribution.

<Step S11>

In step S11, the reading processing unit 311 of the control unit 31 starts to read the code information. Specifically, the reading processing unit 311 displays a code reading screen P0 shown in FIG. 6 on the operation/display unit 33, urging the user to photograph an image by using the camera 35. The code reading screen P0 is for urging the user to photograph, by using the camera 35, the code information displayed on the shop terminal 2, or the code information printed on a slip issued by the shop terminal 2. When the code information is included in an image photographed by the camera 35, the reading processing unit 311 reads the code information. It is noted that the reading processing unit 311 may receive the code information from the shop terminal 2 by a short-range wireless communication.

<Step S12>

In step S12, the reading processing unit 311 of the control unit 31 determines, based on the image data output from the camera 35, whether or not the code information has been read from the image photographed by the camera 35. When it is determined that the code information has been read (S12: Yes), the process moves to step S13, and until the code information is read (S12: No), the process waits at step S12.

<Step S13>

In step S13, the control unit 31 determines whether or not information for performing the cryptocurrency payment is included in the code information. Specifically, when the code information includes an amount of payment by the cryptocurrency and the second exchange information, the control unit 31 determines that the cryptocurrency information is included in the code information. It is noted that the amount of payment by the cryptocurrency may include one or more amounts of payments that correspond to one or more types of cryptocurrencies that can be received at one or more second exchanges included in the second exchange information. In addition, information of a charge amount of cash for the payment at this time may be included in the code information.

When it is determined that information for the cryptocurrency payment is not included in the code information (S13: No), an error is notified for example, and the process returns to step S12. On the other hand, when it is determined that information for the cryptocurrency payment is included in the code information (S13: Yes), the process moves to step S14.

<Step S14>

In step S14, the control unit 31 receives an operation to input a cryptocurrency remittance source account and a cryptocurrency type. For example, in a case where a plurality of cryptocurrency remittance source accounts are preliminarily registered by the user and stored in the storage unit 32, the control unit 31 displays an operation screen for selecting an account for use at this time from the plurality of cryptocurrency remittance source accounts, and receives a selection operation from the user. In addition, in a case where one cryptocurrency remittance source account is preliminarily registered by the user and stored in the storage unit 32, the control unit 31 may automatically select the registered account as the account for use at this time. Furthermore, the control unit 31 may receive a user operation to newly register a cryptocurrency remittance source account, and store the account in the storage unit 32.

In addition, in a case where a plurality of types of cryptocurrencies can be used for the payment from the account selected for use at this time, the control unit 31 displays an operation screen for selecting a cryptocurrency type to be used for the payment at this time from the plurality of types of cryptocurrencies, and receives a selection operation from the user. Here, only one or more types of cryptocurrencies included in the second exchange information, among the plurality of types of cryptocurrencies, may be displayed on the operation screen. In addition, in a case where only a cryptocurrency type can be paid from the account selected for use at this time, the control unit 31 may automatically select the cryptocurrency type as the cryptocurrency type for use at this time. Furthermore, the control unit 31 may display, as candidates for selection, one or more types of cryptocurrencies that are deposited in any of the accounts registered in the user terminal 3. It is noted that the control unit 31 may display a screen for selecting a cryptocurrency type first to receive a user operation selecting a cryptocurrency type, and then display one or more accounts to which the selected cryptocurrency type can be paid to receive a user operation selecting an account.

<Step S15>

In step S15, the control unit 31 starts to receive an operation to input a cryptocurrency remittance destination account. Specifically, the control unit 31 displays an exchange selection screen P1 shown in FIG. 7 on the operation/display unit 33.

Figure 7:
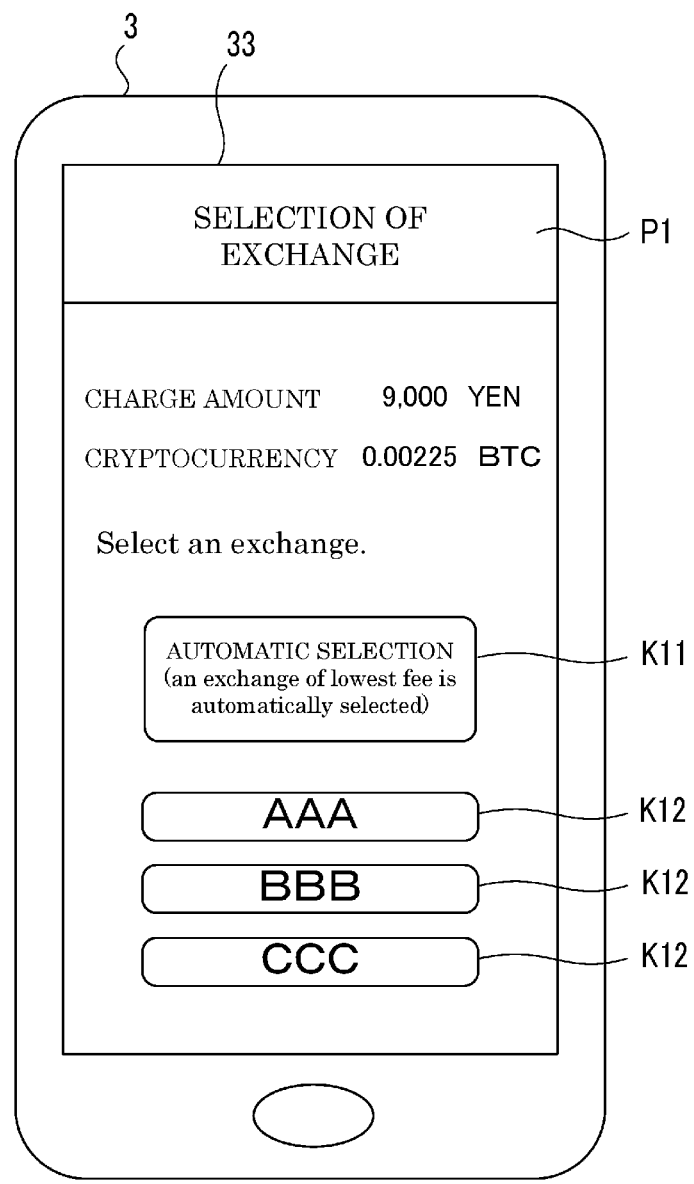
FIG. 7 is a diagram showing an example of an exchange selection screen displayed on the user terminal of the cryptocurrency payment support system according to an embodiment of the present invention.

On the exchange selection screen P1 shown in FIG. 7, a charge amount for cash, and an amount to be paid by the cryptocurrency selected in the step S14 are displayed for the payment at this time. In addition, on the exchange selection screen P1, an operation key K11 and operation keys K12 are displayed, wherein the operation key K11 is operated for an automatic selection of an exchange, and the operation key K12 is operated for selecting an exchange from possible exchanges. Specifically, the control unit 31 displays, on the exchange selection screen P1, one or more operation keys K12 that correspond to one or more second exchanges at which the cryptocurrency selected in the step S14 can be received, among the second exchanges included in the second exchange information. It is noted that when there are a plurality of electronic payment services that can be used by the user, the control unit 31 may receive an operation to select an electronic payment service for use in the payment at this time, on the exchange selection screen P1 or another screen (electronic payment service selection screen).

<Step S16>

In step S16, the control unit 31 determines whether or not a manual selection operation for selecting a remittance destination exchange has been performed. Specifically, the control unit 31 determines that a manual selection operation has been performed when any one of the operation keys K12 has been operated for selection. When it is determined that a manual selection operation has been performed (S16: Yes), the process moves to step S20. When it is determined that a manual selection operation has not been performed (S16: No), the process moves to step S17.

<Step S17>

In step S17, the control unit 31 determines whether or not an automatic selection operation for selecting a remittance destination exchange has been performed. Specifically, the control unit 31 determines that an automatic selection operation has been performed when the operation key K11 has been operated. When it is determined that an automatic selection operation has been performed (S17: Yes), the process moves to step S18. When it is determined that an automatic selection operation has not been performed (S17: No), the process returns to step S16.

<Step S18>

In step S18, the control unit 31 executes a process to identify, among second exchanges that have accounts that are candidates for the remittance destination account, a second exchange that requires the lowest remittance fee for remittance of the remittance-target cryptocurrency type. It is noted that identifying, among candidates for the remittance destination account, an account that requires the lowest remittance fee when the remittance-target cryptocurrency type is remitted thereto from the remittance source account, is the same as identifying an exchange that requires the lowest remittance fee.

Specifically, the control unit 31 transmits, to the cryptocurrency payment support apparatus 1, an exchange identification request for identifying a second exchange that requires the lowest fee. The exchange identification request includes user identification information, first exchange information, and second exchange information, wherein the user identification information is for identifying the user of the user terminal 3, the first exchange information is concerned with one or more first exchanges in which the user of the user terminal 3 has accounts, and the second exchange information is concerned with one or more second exchanges in which the shop where the shop terminal 2 is installed has accounts. It is noted that although in the present embodiment, the first exchange information is stored in the storage unit 32, the control unit 31 may log in a server apparatus of the first exchange by executing management software supplied from the first exchange, and read the first exchange information stored in the server apparatus of the first exchange.

As described below, in the cryptocurrency payment support apparatus 1, among a plurality of second exchanges, a second exchange that requires the lowest remittance fee for the remittance with the first exchange is identified, and information of the identified second exchange is transmitted to the user terminal 3. This makes it possible for the user terminal 3 to identify, among a plurality of second exchanges that have accounts that are candidates for the remittance destination account, a second exchange that requires the lowest remittance fee for the remittance of a selected cryptocurrency type with the first exchange having the remittance source account.

<Step S19>

In step S19, the control unit 31 sets, among the candidates for the remittance destination account, an account of the second exchange identified in the step S18, as the remittance destination. This allows an account that requires the lowest remittance fee, to be automatically selected from candidates for the remittance destination account.

<Step S20>

Figure 8:
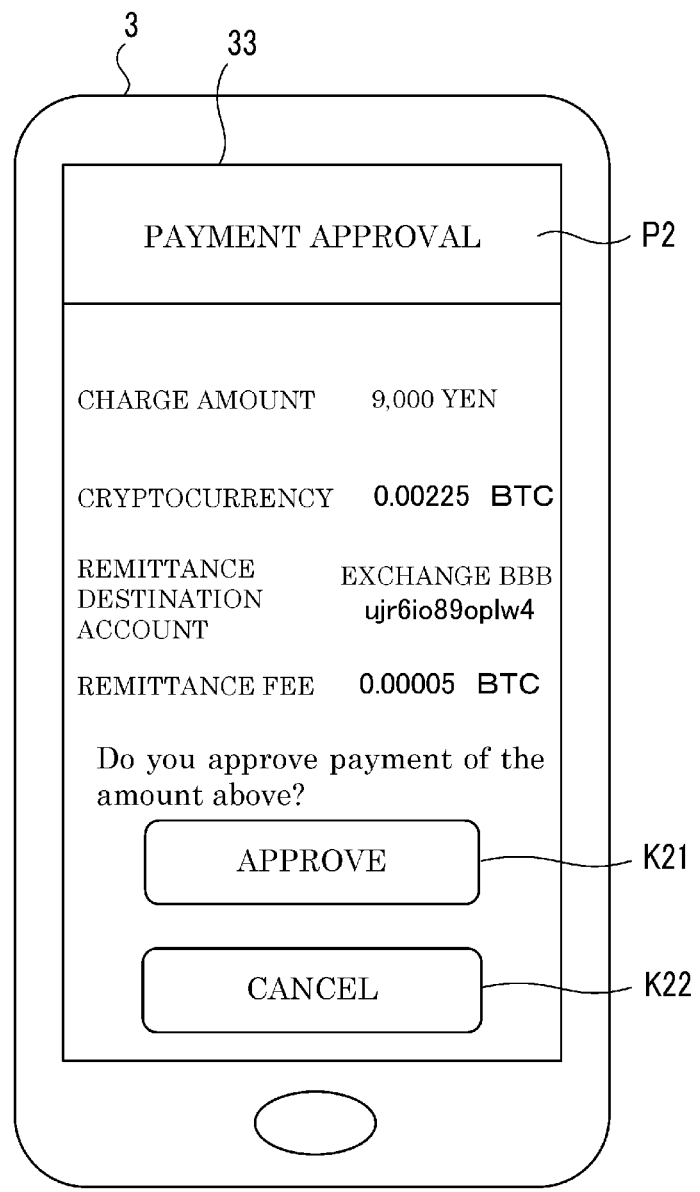
FIG. 8 is a diagram showing an example of a payment approval screen displayed on the user terminal of the cryptocurrency payment support system according to an embodiment of the present invention.

In step S20, the control unit 31 displays a payment approval screen P2 on the operation/display unit 33 so that the user can perform an approval operation for the payment at this time. Here, FIG. 8 is a diagram showing an example of the payment approval screen P2. A charge amount included in the code information read in the step S12, and an amount of payment of the cryptocurrency corresponding to the charge amount, are displayed on the payment approval screen P2. In addition, an exchange name and an address of the charge amount remittance destination, and a remittance fee required for the remittance at this time, are displayed on the payment approval screen P2. Furthermore, operation keys K21 and K22 are displayed on the payment approval screen P2, wherein the operation key K21 is operated to approve the payment of the charge amount, and the operation key K22 is operated to cancel the payment. It is noted that an authentication process such as a password input or a fingerprint collation may be executed when the operation key K21 is operated.

<Step S21>

In step S21, the control unit 31 determines whether or not a payment approval operation has been performed. For example, the control unit 31 determines that the payment approval operation has been performed when the operation key K21 included in the payment approval screen P2 has been operated. On the other hand, the control unit 31 determines that the payment approval operation has not been performed when the operation key K21 included in the payment approval screen P2 has not been operated. When it is determined that the payment approval operation has been performed (S21: Yes), the process moves to step S22. In addition, when the operation key K22 included in the payment approval screen P2 is operated, the payment at this time is cancelled, and the user terminal process ends.

<Step S22>

In step S22, the payment processing unit 312 of the control unit 31 executes a cryptocurrency remittance process. Specifically, the payment processing unit 312 transmits a remittance instruction to an exchange so that an amount of cryptocurrency corresponding to the amount of payment is remitted from the remittance source account to the account selected in the step S16 or the step S19. This allows the cryptocurrency to be remitted from the remittance source account to the remittance destination account, and a remittance completion screen is displayed on the operation/display unit 33 of the user terminal 3. It is noted that for example, the remittance process is executed with use of cryptocurrency management software preliminarily installed in the user terminal 3.

[Payment Support Process]

Figure 6:
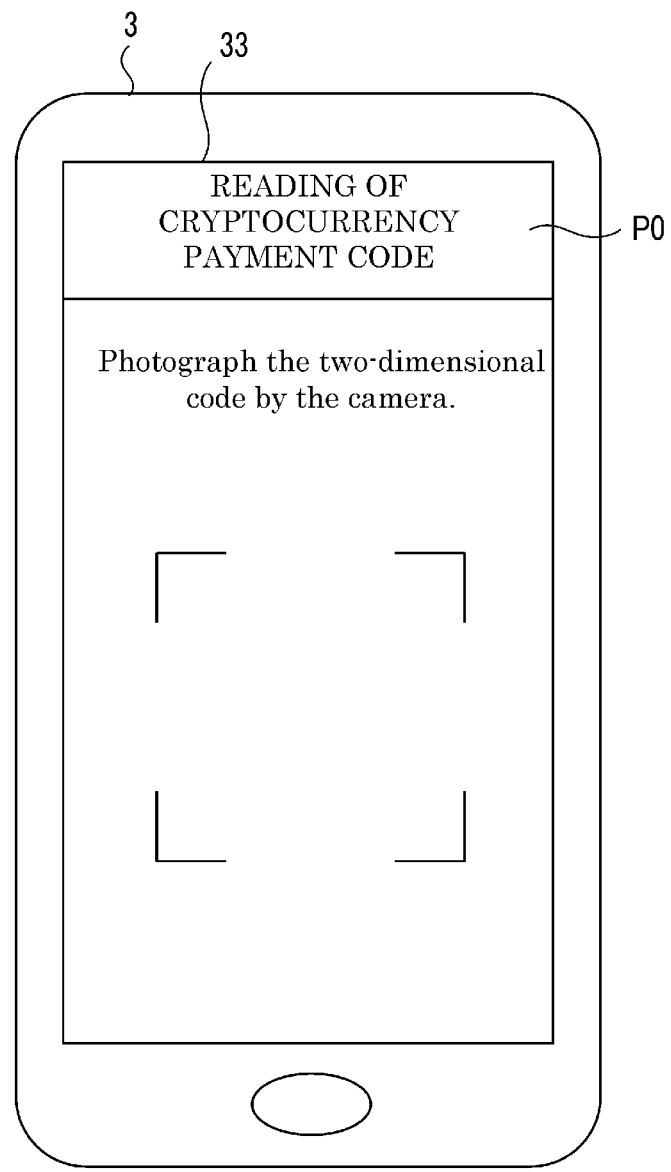
FIG. 6 is a diagram showing an example of a code reading screen displayed on the user terminal of the cryptocurrency payment support system according to an embodiment of the present invention.

The following describes a payment support process executed by the control unit 11 of the cryptocurrency payment support apparatus 1, with reference to FIG. 6. For example, the control unit 11 starts to execute the payment support process by starting to execute the cryptocurrency payment support program in response to an access from the user terminal 3. It is noted that when the cryptocurrency payment support apparatus 1 is accessed by a plurality of user terminals 3, the control unit 11 may execute the payment support process in parallel individually for each of the user terminals 3.

It is noted that one or more steps included in the payment support process described here may be omitted as necessary. In addition, the steps constituting the payment support process may be executed in a different order as far as the same action and effect are produced. Furthermore, although the present embodiment describes an example case where the steps constituting the payment support process are executed by the control unit 11, in another embodiment, the steps may be executed by a plurality of processors by distribution.

<Step S31>

In step S31, the control unit 11 waits to receive the exchange identification request for identifying an exchange that requires the lowest fee (S31: No). When it is determined that the exchange identification request has been received (S31: Yes), the process moves to step S32. As described above, the exchange identification request includes the user identification information, the first exchange information, and the second exchange information.

<Step S32>

In step S32, the acquisition processing unit 111 of the control unit 11 acquires the first exchange information by extracting it from the exchange identification request received from the user terminal 3. In addition, as another embodiment, a plurality of pieces of first exchange information may be preliminarily stored in the storage unit 12 respectively in correspondence with a plurality of users, and the acquisition processing unit 111 may acquire the first exchange information by reading a piece of first exchange information of a user corresponding to the user identification information, from the storage unit 12.

<Step S33>

In step S33, the acquisition processing unit 111 of the control unit 11 acquires the second exchange information by extracting it from the exchange identification request received from the user terminal 3. In addition, as another embodiment, a plurality of pieces of second exchange information may be preliminarily stored in the storage unit 12 respectively in correspondence with a plurality of restaurants, and the acquisition processing unit 111 may acquire the second exchange information by reading a piece of second exchange information of a restaurant corresponding to the shop identification information, from the storage unit 12.

<Step S34>

In step S34, the acquisition processing unit 111 of the control unit 11 acquires the fee information D1 by reading it from the storage unit 12. It is noted that the acquisition processing unit 111 may acquire the fee information D1 from a specific server apparatus via the Internet or the like.

<Step S35>

In step S35, the control unit 11 identifies among the second exchanges, a second exchange that requires the lowest remittance fee for the remittance with the first exchange, based on the first exchange information, the second exchange information, and the fee information D1 acquired in the steps S32 to S34. For example, in a case where the first exchange is "AAA", and the second exchanges are "AAA", "BBB", and "CCC", the fee information D1 indicates that a combination of "AAA" and "AAA" requires the lowest remittance fee, "0". Accordingly, among the second exchanges, second exchange "AAA" is identified as an exchange that requires the lowest remittance fee. On the other hand, in a case where the first exchange is "AAA", and the second exchanges are "BBB" and "CCC", the fee information D1 indicates that a combination of "AAA" and "BBB" requires the lowest remittance fee, "0.00005". Accordingly, among the second exchanges, second exchange "BBB" is identified as an exchange that requires the lowest remittance fee. It is noted that when the remittance fee is a minus value (for example, "−0.00005"), it is determined that the remittance fee is lower than remittance fee "0".

Furthermore, the fee information D1 may include return information that indicates an amount of money or points to be returned to a user when an exchange is used by the user. In that case, when, in the step S35, the control unit 11 identifies the second exchange that requires the lowest remittance fee, the control unit 11 may identify a second exchange that requires substantially the lowest remittance fee, based on the value of the remittance fee indicated in the fee information D1 and the return information. Specifically, the control unit 11 may identify a second exchange for which a value that is obtained by subtracting an amount of money or points that are returned to the user, from the remittance fee for the remittance with the first exchange, is the lowest. For example, in a case where there are a plurality of second exchanges that require the same remittance fee for the first exchange, a second exchange by which the highest amount of money or points are returned to the user, is identified. It is noted that the points may not represent the same value as the amount of money. In that case, when the second exchange is identified, a predetermined rate of exchange may be used to convert the points into an amount of money.
<Step S36>

In step S36, the control unit 11 transmits, to the user terminal 3, information of the second exchange that was identified in the step S35 as the remittance destination exchange that requires the lowest remittance fee. This allows the user terminal 3 to recognize, among the second exchanges, an exchange that requires the lowest remittance fee.

[Shop Terminal Process]

Figure 5:
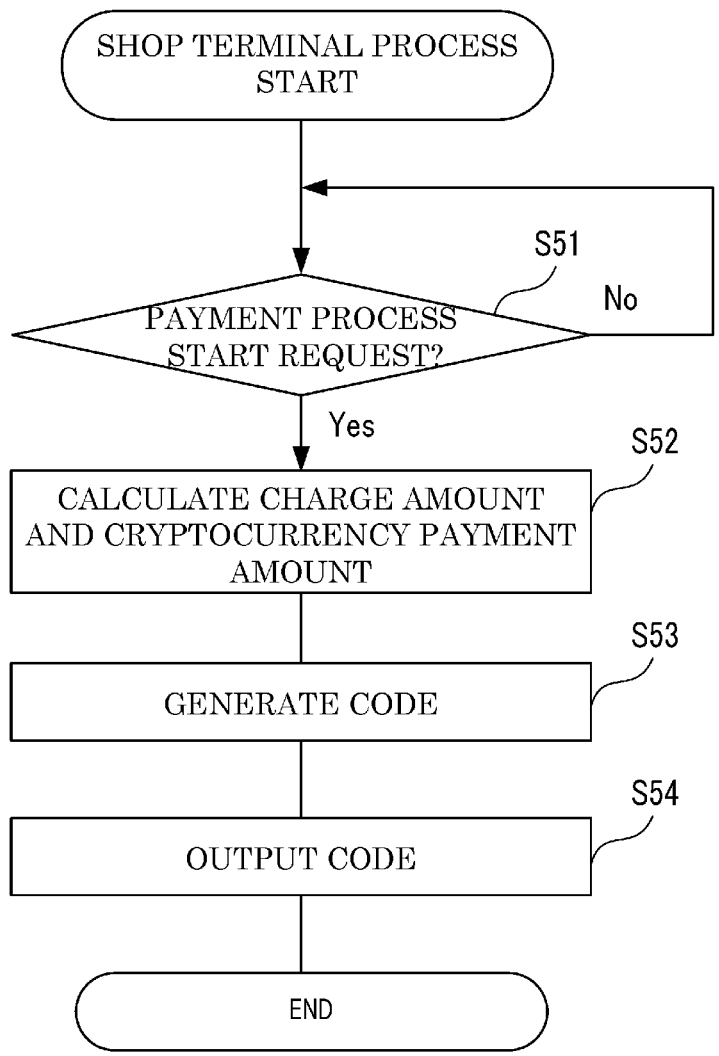
FIG. 5 is a flowchart showing an example of a procedure of a shop terminal process executed in a shop terminal of the cryptocurrency payment support system according to an embodiment of the present invention.

The following describes a shop terminal process executed by the control unit 21 of the shop terminal 2, with reference to FIG. 5. For example, the control unit 21 starts to execute the shop terminal process in accordance with the shop terminal program in response to an operation of a staff member of a restaurant instructing to start a cryptocurrency payment. It is noted that the shop terminal process may be ended halfway in response to a predetermined operation performed on the shop terminal 2. It is noted that the control unit 21 executes the shop terminal process in parallel individually for each of the tables installed in the restaurant (namely, for each customer or each group of customers of the restaurant).

It is noted that one or more steps included in the shop terminal process described here may be omitted as necessary. In addition, the steps constituting the shop terminal process may be executed in a different order as far as the same action and effect are produced. Furthermore, although the present embodiment describes an example case where the steps constituting the shop terminal process are executed by the control unit 21, in another embodiment, the steps may be executed by a plurality of processors by distribution.
<Step S51>

In step S51, the control unit 21 waits to receive a payment process start request from a specific table (S51: No). Specifically, the control unit 21 determines that the payment process start request has been made when an operation to start payment has been performed to the shop terminal 2. For example, the control unit 21 determines that the payment process start request has been made when the code of a slip issued to the payment-target table has been read. When it is determined that a payment process start request has been made (S51: Yes), the process moves to step S52.
<Step S52>

In step S52, the calculation processing unit 212 of the control unit 21, in response to a payment process start request from a specific table, calculates a charge amount to be charged for the table. Specifically, the control unit 21 calculates the charge amount for the table based on the order history information, and calculates a cryptocurrency payment amount corresponding to the charge amount.
<Step S53>

In step S53, the code generation processing unit 213 of the control unit 21 generates the code information that includes: information of the charge amount and the cryptocurrency payment amount calculated in the step S52; shop identification information for identifying the restaurant where the shop terminal 2 is installed; and a piece of second exchange information corresponding to the restaurant.
<Step S54>

In step S54, the output processing unit 214 of the control unit 21 outputs and displays the code information generated in the step S53, on the operation/display unit 23. It is noted that the control unit 21 may output and print the code information. This allows the user to read the code information by using the user terminal 3. It is noted that the output processing unit 214 may transmit the code information to the user terminal 3 by a short-range wireless communication.

As described above, in the cryptocurrency payment support system 100 according to the present embodiment, it is possible to identify, among a plurality of second exchanges that have accounts that can be used for the payment at a restaurant, a second exchange that requires the lowest remittance fee for the remittance with the first exchange in which the user has an account. Accordingly, it is possible to support an easy selection of a second exchange that restricts a remittance fee in the cryptocurrency payment. In addition, since a second exchange that requires the lowest remittance fee is automatically identified, the program execution speed is increased and the memory use amount is restricted compared to a case where the remittance fees of the plurality of second exchanges are confirmed at the user terminal 3.

Other Embodiments

The following describes other embodiments of the present invention. It is noted that in the following embodiments, description of components that are the same as those of the cryptocurrency payment support system 100 of the first embodiment is omitted, and different points are mainly described.

Second Embodiment

The first embodiment describes an example case where the cryptocurrency payment support apparatus 1 executes the process for identifying an exchange that requires the lowest remittance fee. The second embodiment describes an example case where the user terminal 3 executes the process for identifying an exchange that requires the lowest remittance fee. Here, FIG. 9 is a diagram showing an example of the cryptocurrency payment support system 100 according to the second embodiment.

Figure 9:
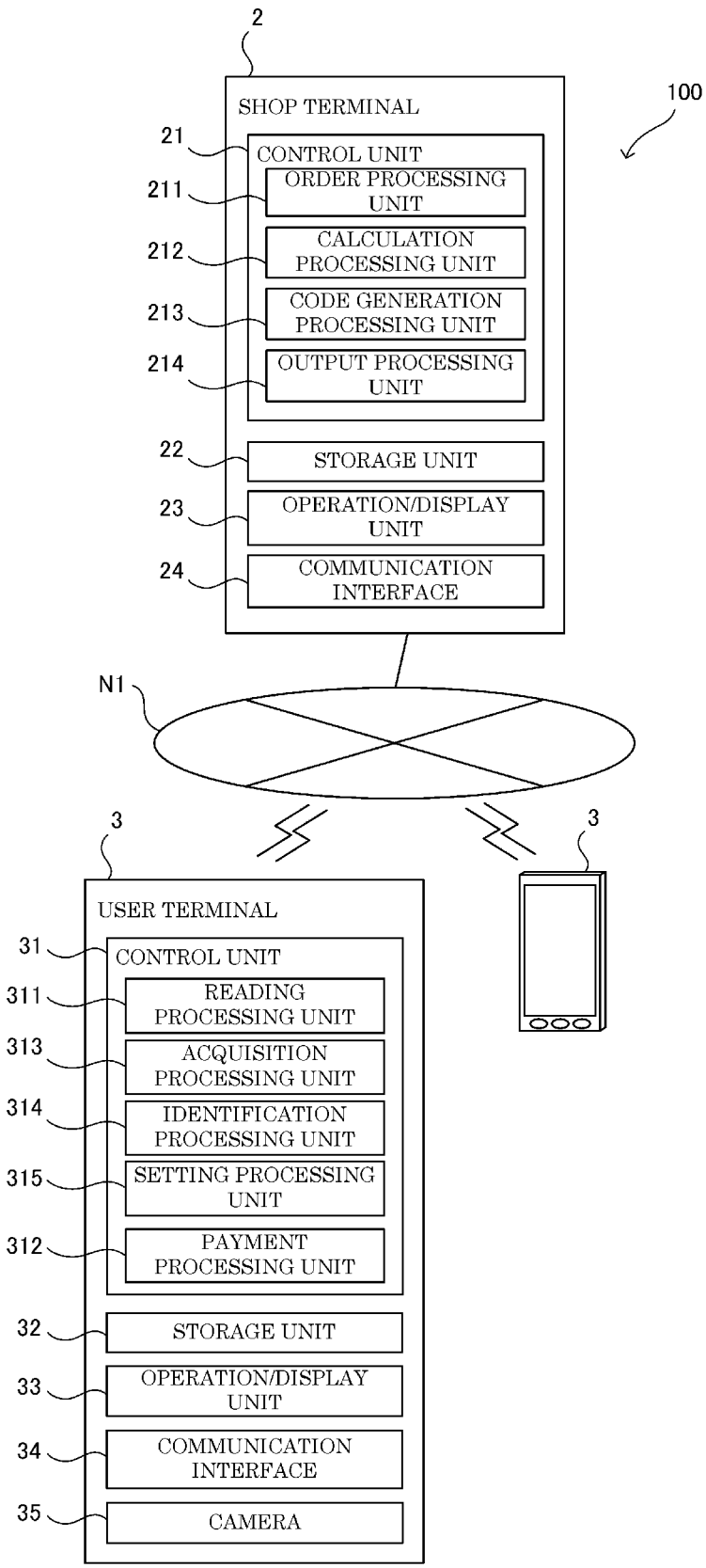
FIG. 9 is a block diagram showing a configuration of a cryptocurrency payment support system according to an embodiment of the present invention.

As shown in FIG. 9, in the cryptocurrency payment support system 100 according to the second embodiment, the user terminal 3 is an example of the cryptocurrency payment support apparatus, and the cryptocurrency payment support apparatus 1 is omitted. In addition, the control unit 31 of the user terminal 3 further includes an acquisition processing unit 313, an identification processing unit 314, and a setting processing unit 315. Furthermore, the fee information D1 is stored in the storage unit 32 of the user terminal 3.

The acquisition processing unit 313 acquires the first exchange information, the second exchange information, and the fee information D1. The identification processing unit 314 identifies, among a plurality of second exchanges, a second exchange that requires the lowest remittance fee for the remittance with the first exchange, based on the first exchange information, the second exchange information, and the fee information D1. The setting processing unit 315 sets the account of the second exchange identified by the identification processing unit 314, as a remittance destination account for the remittance of the cryptocurrency from the first exchange.

[Remittance Destination Selecting Process]

Figure 10:
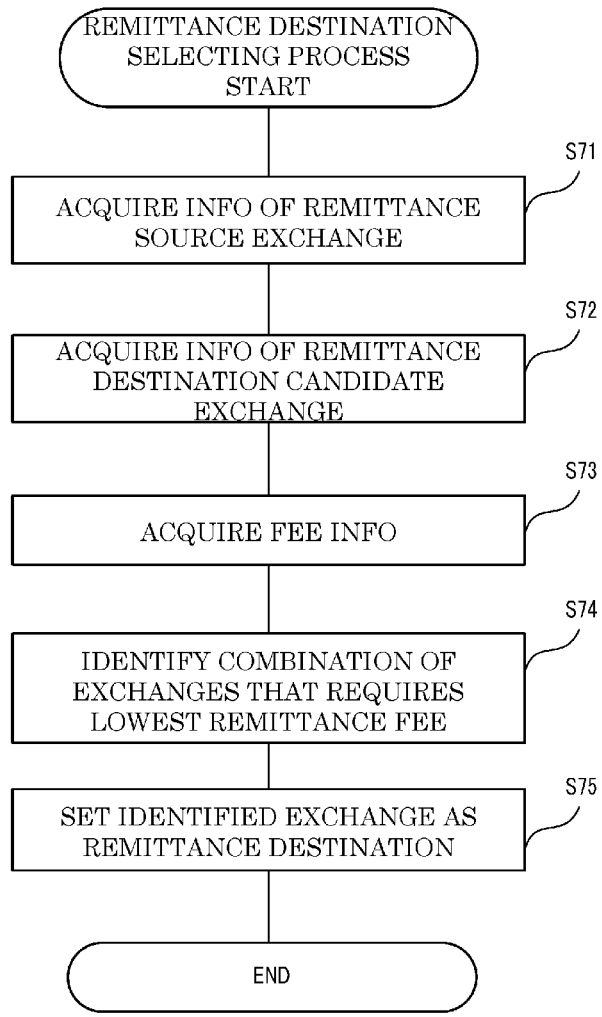
FIG. 10 is a flowchart showing an example of a procedure of a remittance destination selecting process executed in the user terminal of the cryptocurrency payment support system according to an embodiment of the present invention.

Specifically, the control unit 31 of the user terminal 3 executes a remittance destination selecting process in stead of the steps S18 to S19 so that a remittance destination that requires the lowest remittance fee can be set automatically. Here, FIG. 10 is a flowchart showing an example of the remittance destination selecting process.

<Step S71>

In step S71, the acquisition processing unit 313 of the control unit 31 acquires a piece of first exchange information of the user of the user terminal 3, by reading it from the storage unit 32. It is noted that the acquisition processing unit 313 may acquire the first exchange information by logging in a server apparatus of the first exchange by executing management software supplied from the first exchange, and reading the first exchange information from the server apparatus.

<Step S72>

In step S72, the acquisition processing unit 313 of the control unit 31 acquires a piece of second exchange information of the restaurant by extracting it from the code information.

<Step S73>

In step S73, the acquisition processing unit 313 of the control unit 31 acquires the fee information D1 by reading it from the storage unit 32.

<Step S74>

In step S74, the identification processing unit 314 of the control unit 31 identifies, among a plurality of second exchanges, a second exchange that requires the lowest remittance fee for the remittance with the first exchange, based on the first exchange information, the second exchange information, and the fee information D1 acquired in the steps S71 to S73.

<Step S75>

In step S75, the setting processing unit 315 of the control unit 31 sets a piece of address information corresponding to an account of the second exchange identified in the step S74 among the second exchanges included in the second exchange information, as the remittance destination for the payment at this time performed in the user terminal 3. It is noted that in the step S75, the setting processing unit 315 may display, on the operation/display unit 33, an operation screen for the user to confirm the setting of the remittance destination, and confirm the setting of the remittance destination in accordance with a confirmation operation performed by the user.

After the above-described steps, the user terminal 3 executes in the step S20 and onward a process to remit the cryptocurrency to the remittance destination set in the step S75.

As described above, in the cryptocurrency payment support system 100 according to the second embodiment, too, it is possible to identify, among a plurality of second exchanges having accounts that can be used for a payment at a restaurant, a second exchange that requires the lowest remittance fee for the remittance with the first exchange in which the user has an account. Accordingly, it is possible to support an easy selection of a second exchange that restricts a remittance fee in the cryptocurrency payment. In addition, since the process for automatically identifying a second exchange that requires the lowest remittance fee is executed in the user terminal 3, the need to communicate with the cryptocurrency payment support apparatus 1 or the like is eliminated, thereby the data communication fee is restricted, and the program execution speed is increased.

Third Embodiment

The first embodiment and the second embodiment describe a case where the cryptocurrency is remitted from an account of the user to an account of a restaurant. The third embodiment describes a case where the cryptocurrency is remitted from an account of the user to an account of a payment agent. That is, the third embodiment describes the cryptocurrency payment support system 100 in which the user can make a payment by the cryptocurrency even when the restaurant does not own an account for cryptocurrency.

In the third embodiment, agent exchange information is stored in the storage unit 12 of the cryptocurrency payment support apparatus 1, wherein the agent exchange information is information concerning one or more exchanges (hereinafter referred to as "agent exchanges") in which the payment agent owns accounts. The agent exchange information includes the exchange identification information, the cryptocurrency type, and the address information.

<Step S53>

In the shop terminal process (see FIG. 5) executed by the shop terminal 2 in the third embodiment, the code information is generated in the step S53, wherein the code information includes the charge amount and the cryptocurrency payment amount, and does not include the second exchange information. It is noted that the code information may include the second exchange information.

<Step S18>

According to the third embodiment, in the user terminal process (see FIG. 3) executed by the user terminal 3, the processes of the steps S15 to S17 are omitted. In addition, in the step S18, the control unit 31 transmits, as the exchange identification request, information such as the first exchange information to the cryptocurrency payment support apparatus 1. It is noted that the exchange identification request may include the second exchange information.

\<Step S33\>

Figure 4:
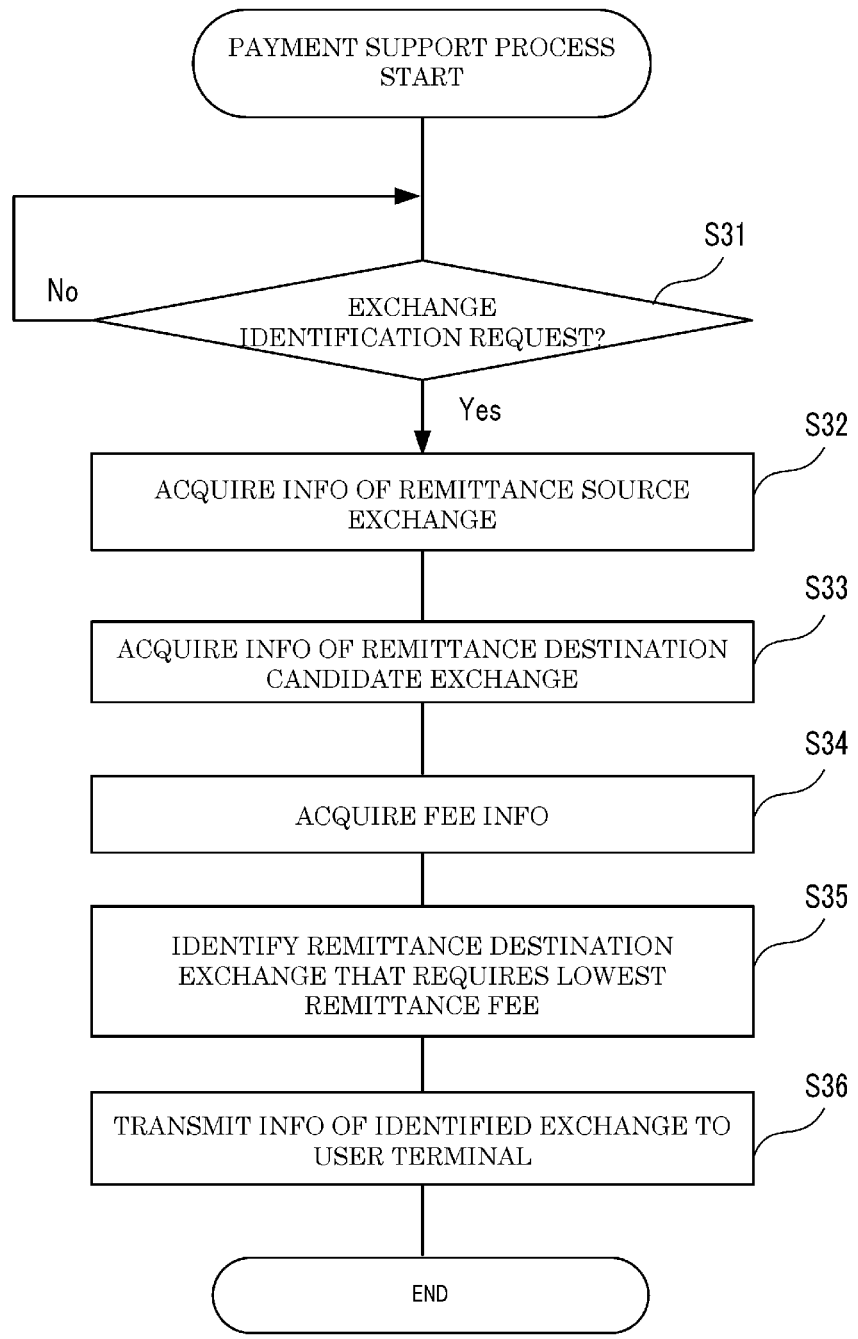
FIG. 4 is a flowchart showing an example of a procedure of a payment support process executed in a cryptocurrency payment support apparatus of the cryptocurrency payment support system according to an embodiment of the present invention.

On the other hand, in the payment support process (see FIG. 4) executed by the cryptocurrency payment support apparatus 1, in the step S33, the control unit 11 acquires the agent exchange information by reading it from the storage unit 12. Here, in the third embodiment, the payment agent is an example of a second user, and the agent exchange information is an example of second exchange information.

\<Step S35\>

In step S35, the control unit 11 identifies, among a plurality of agent exchanges, an agent exchange that requires the lowest remittance fee for the remittance with the first exchange, based on the first exchange information, the agent exchange information, and the fee information D1.

As described above, in the cryptocurrency payment support system 100 according to the third embodiment, it is possible to identify, among a plurality of exchanges that have accounts that can be used by the payment agent for the payment, an exchange that requires the lowest remittance fee for the remittance with an exchange where the user has an account. Accordingly, it is possible to perform the payment by selecting the exchange as the remittance destination. In addition, in the cryptocurrency payment support system 100 according to the third embodiment, the user can perform the payment via the payment agent even when the restaurant does not have an account in a cryptocurrency exchange. It is noted that an amount corresponding to the payment may be provided from the payment agent to the restaurant by a predetermined method using the real currency, the cryptocurrency or the like.

In addition, the second exchange information may be included in both the code information and the exchange identification request, and in the step S35, the control unit 11 may identify, among a plurality of second exchanges and agent exchanges, an exchange that requires the lowest remittance fee for the remittance with the first exchange, based on the first exchange information, the second exchange information, the agent exchange information, and the fee information D1. With this configuration, in the cryptocurrency payment support system 100 according to the third embodiment, it is possible to identify, among a plurality of exchanges having accounts that can be used for a payment by the restaurant or the payment agent, an exchange that requires the lowest remittance fee for the remittance with the first exchange in which the user has an account. Accordingly, it is possible to perform the payment by selecting the exchange as the remittance destination.

In addition, similar to the second embodiment, the agent exchange information may be stored in the storage unit 32 of the user terminal 3, and the control unit 31 may identify, among a plurality of agent exchanges, an agent exchange that requires the lowest remittance fee for the remittance with the first exchange, based on the first exchange information, the agent exchange information, and the fee information D1. Furthermore, the second exchange information may be included in both the code information and the exchange identification request, and the control unit 31 may identify, among a plurality of second exchanges and agent exchanges, an exchange that requires the lowest remittance fee for the remittance with the first exchange, based on the first exchange information, the second exchange information, the agent exchange information, and the fee information D1.

Fourth Embodiment

The first to third embodiments describe example cases where an exchange that requires the lowest remittance fee is automatically selected as the remittance destination. The fourth embodiment describes a configuration where the user can select a remittance destination by considering the remittance fee.

Specifically, in the steps S35 to S36 (see FIG. 4) executed in the cryptocurrency payment support apparatus 1, remittance fees respectively corresponding to candidates for the remittance destination exchange may be extracted from the fee information D1 and notified to the user terminal 3. In addition, in the steps S74 to S75 (see FIG. 10) executed in the user terminal 3, remittance fees respectively corresponding to candidates for the remittance destination exchange may be extracted from the fee information D1.

In the user terminal 3, before the payment approval screen P2 is displayed in the step S20, the control unit 31 displays, on the operation/display unit 33, an exchange selecting screen P3 for selecting a remittance destination from candidates for the remittance destination exchange. Here, FIG. 11 is a diagram showing an example of the exchange selecting screen P3.

Figure 11:
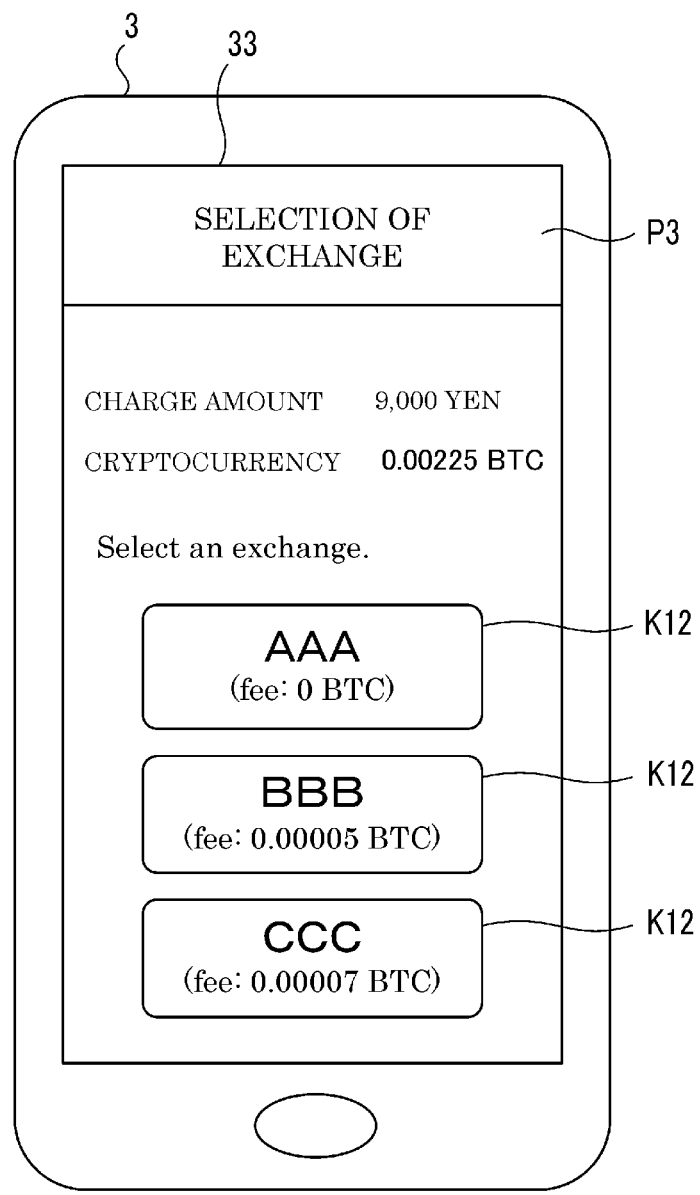
FIG. 11 is a diagram showing an example of an exchange selection screen displayed on the user terminal of the cryptocurrency payment support system according to an embodiment of the present invention.

As shown in FIG. 11, on the exchange selecting screen P3, the name of an exchange and a remittance fee are displayed on each of operation keys K12 that respectively correspond to candidates for the remittance destination exchange. In particular, the control unit 31 displays the operation keys K12 corresponding to the candidates for the remittance destination exchange, in order from the lowest remittance fee. Subsequently, when an exchange is selected on the exchange selecting screen P3, the control unit 31 executes the processes of the step S20 and onward such that the cryptocurrency is remitted to the exchange.

As described above, in the cryptocurrency payment support system 100 according to the fourth embodiment, a remittance fee is displayed for each of exchanges that have accounts that can be used for the payment. This allows the user to select a remittance destination exchange while easily recognizing the remittance fee required for it.

Fifth Embodiment

Meanwhile, the user of the user terminal 3 may own the same type of cryptocurrency in a plurality of accounts in a plurality of exchanges. In addition, in the user terminal 3, the control unit 31 may receive an operation to register information of a plurality of accounts in a plurality of first exchanges owned by the user, and store the information in the storage unit 32.

\<Step S18\>

Specifically, the exchange identification request that is transmitted in the step S18 (see FIG. 3) includes, as the first exchange information, information of a plurality of accounts of a plurality of exchanges owned by the user. It is noted that in this case, the step S14 may be omitted, or information of a plurality of accounts may be registered in the step S14.

\<Step S35\>

In the step S35 (see FIG. 4) executed by the cryptocurrency payment support apparatus 1, among combinations of one or more first exchanges and one or more second exchanges, a combination of a first exchange and a second exchange that requires the lowest remittance fee is identified. Subsequently, in the step S36, the combination of the first exchange and the second exchange that requires the lowest remittance fee is transmitted to the user terminal 3. This allows the user terminal 3 to, in the step S19, select a remittance source account and a remittance destination account based on the combination of the first exchange and the second exchange that requires the lowest remittance fee, received from the cryptocurrency payment support apparatus 1.

<Step S74>

In a case where, as described in the second embodiment, the process to identify an exchange that requires the lowest remittance fee is executed in the user terminal 3, in the step S74, a combination of a first exchange and a second exchange that requires the lowest remittance fee is identified among combinations of one or more first exchanges and one or more second exchanges. This allows the user terminal 3 to, in the step S75, select a remittance source account and a remittance destination account based on the combination of the first exchange and the second exchange that requires the lowest remittance fee.

As described above, in the cryptocurrency payment support system 100 according to the fifth embodiment, the payment is performed by using a combination of accounts that requires the lowest remittance fee, among combinations of accounts of exchanges owned by the user and accounts of exchanges that can be used by the restaurant.

Sixth Embodiment

The user of the user terminal 3 may own accounts of a plurality of types of cryptocurrencies. Similarly, the restaurant where the shop terminal 2 is installed may own accounts of a plurality of types of cryptocurrencies. In this case, in the cryptocurrency payment support system 100, a combination of a first exchange, a second exchange, and a type of cryptocurrency among a plurality of types of cryptocurrencies, that requires the lowest remittance fee for the remittance between the user and the restaurant, may be identified. In this case, the process of step S14 is omitted.

<Steps S35 to S36>

Specifically, in the step S35 (see FIG. 4), among combinations of the first exchanges and the types of cryptocurrences, and combinations of the second exchanges and the types of cryptocurrencies, a combination of a first exchange, a second exchange, and a type of cryptocurrency that requires the lowest remittance fee is identified based on the fee information D1. Subsequently, in the step S36, the combination of the first exchange, the second exchange, and the type of cryptocurrency that requires the lowest remittance fee, identified in the step S35 is transmitted to the user terminal 3. This allows the user terminal 3 to, in the step S19, select a remittance source account and a remittance destination account based on the combination of the first exchange, the second exchange, and the type of cryptocurrency that requires the lowest remittance fee.

<Steps S74 to S75>

In a case where, as described in the second embodiment, the process to identify an exchange that requires the lowest remittance fee is executed in the user terminal 3, in the step S74, a combination of a first exchange, a second exchange, and a type of cryptocurrency that requires the lowest remittance fee is identified based on the fee information D1, among combinations of the first exchanges and the types of cryptocurrencies, and combinations of the second exchanges and the types of cryptocurrencies. This allows the user terminal 3 to, in the step S75, select a remittance source account and a remittance destination account based on the combination of the first exchange, the second exchange, and the type of cryptocurrency that requires the lowest remittance fee.

As described above, in the cryptocurrency payment support system 100 according to the sixth embodiment, the payment is performed by using a combination that requires the lowest remittance fee, among combinations of types of cryptocurrencies and accounts of first exchanges owned by the user, and combinations of types of cryptocurrencies and accounts of second exchanges that can be used by the restaurant.

Seventh Embodiment

The payment process may be executed in the shop terminal 2.

Specifically, in response to a user operation, the control unit 31 of the user terminal 3 generates code information that includes the first exchange information, and outputs and displays the code information on the operation/display unit 33. Subsequently, the code information is read by a camera (not shown) included in the shop terminal 2. It is noted that the code information may be transmitted from the user terminal 3 to the shop terminal 2 by a short-range wireless communication.

In the shop terminal 2, the control unit 21 selects a first exchange and a second exchange that require the lowest remittance fee based on the first exchange information, the second exchange information, and the fee information D1. Subsequently, the control unit 21 executes a payment process in which to display an approval screen for the payment at this time on the operation/display unit 23, and in response to a confirmation operation of the user, transmit a remittance request for remittance from the first exchange to the second exchange, to a server apparatus of the first exchange.

Eighth Embodiment

The eighth embodiment describes a configuration in which a process to remit a cryptocurrency from an account of the user to an account of the restaurant is executed in the cryptocurrency payment support apparatus 1. That is, the eighth embodiment describes a configuration where the cryptocurrency payment support apparatus 1, as a substitute, carries out the remittance of the cryptocurrency from an account of the user to an account of the restaurant.

Figure 14:
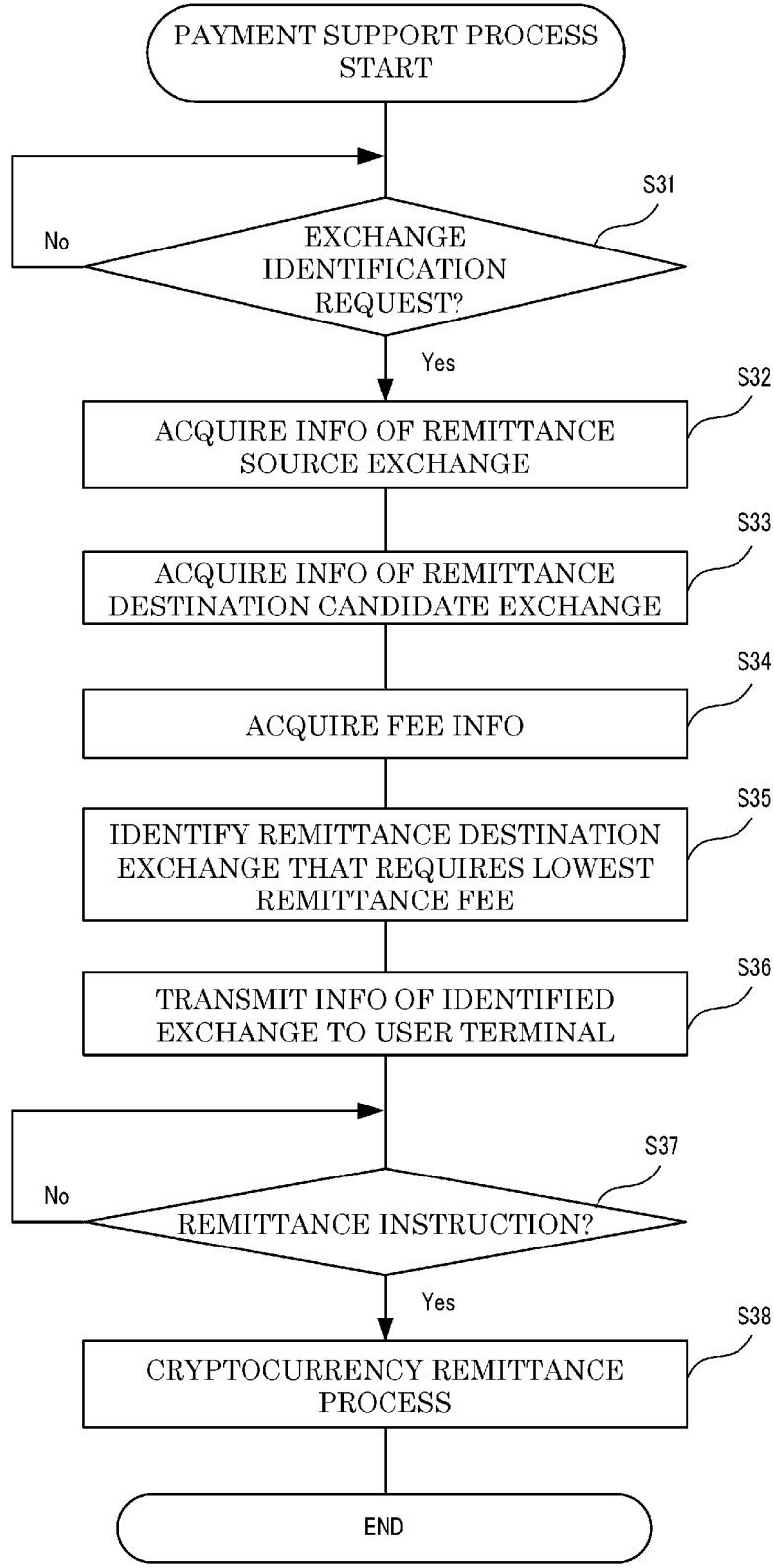
FIG. 14 is a flowchart showing an example of a procedure of a user terminal process executed in a user terminal of the cryptocurrency payment support system according to an embodiment of the present invention.

Specifically, first correspondence information D2 (see FIG. 12) and second correspondence information D3 (see FIG. 13) are preliminarily stored in the storage unit 12 of the cryptocurrency payment support apparatus 1, wherein the first correspondence information D2 shows correspondence relationship between user identification information and first exchange information, and the second correspondence information D3 shows correspondence relationship between shop identification information and second exchange information. It is noted that the control unit 11 of the cryptocurrency payment support apparatus 1 is configured to register or edit the first correspondence information D2 and the second correspondence information D3 in accordance with a user operation performed on the user terminal 3 or the shop terminal 2. In addition, the output processing unit 213 of the shop terminal 2 outputs the code information that includes the shop identification information and the charge amount. The control unit 11 of the cryptocurrency payment support apparatus 1 executes the payment support process shown in FIG. 14. It is noted that the same processing procedures as those of the payment support process (see FIG. 4) are assigned the same reference signs, and description thereof may be omitted.

<Step S31>

In step S31, the control unit 11 waits to receive the exchange identification request from the user terminal 3. In the eighth embodiment, the exchange identification request transmitted from the user terminal 3 includes the user identification information and the shop identification information. This allows the control unit 11 to identify a piece of user identification information of the remittance source and a piece of shop identification information of the remittance destination.

<Steps S32 to S33>

In the step S32, the control unit 11 acquires information of an exchange as the remittance source where the user has an account, based on the user identification information and the first correspondence information D2 stored in the storage unit 12. Similarly, in the step S33, the control unit 11 acquires information of an exchange as the remittance destination where the shop has an account, based on the shop identification information and the second correspondence information D3 stored in the storage unit 12.

<Step S37>

In step S37, the control unit 11 waits to receive a remittance instruction from the user terminal 3 (S37: No). When it is determined that the remittance instruction has been received (S37: Yes), the process moves to step S38.

<Step S22>

On the other hand, in the user terminal 3, in the remittance process executed in the step S22, the payment processing unit 312 transmits a remittance instruction to the cryptocurrency payment support apparatus 1 so that an amount of cryptocurrency corresponding to the amount of payment is remitted from the remittance source account to the account selected in the step S16 or the step S19. For example, the remittance instruction includes a password of the remittance source account, an address of the remittance destination, and an amount of cryptocurrency to be remitted.

<Step S38>

In step S38, the control unit 11 transmits a remittance instruction to the exchange so that the amount of cryptocurrency included in the remittance instruction is remitted from the remittance source account to the account selected in the step S16 or the step S19, based on the remittance instruction received from the user terminal 3. It is noted that the remittance instruction includes information such as the password received from the user terminal 3. In addition, each user terminal 3 is associated with a password, and after the cryptocurrency is remitted from the remittance source account to the remittance destination account, remittance completion information or the like is transmitted from the cryptocurrency payment support apparatus 1 to the user terminal 3 and displayed on the user terminal 3. It is noted that, for example, the remittance process is executed by using cryptocurrency management software that is preliminarily installed in the cryptocurrency payment support apparatus 1.

In addition, in the payment support process, the steps S36 to S37 may be omitted, and in the step S38, the remittance instruction may be carried out based on the remittance source exchange and the remittance destination exchange identified in the step S35. That is, when a remittance destination exchange that requires the lowest remittance fee is identified, the remittance to the exchange may be executed immediately without a user operation.

It is noted that the code information may include the second exchange information, and the exchange identification request may include: the first exchange information that indicates information of the exchange where the user has an account; and the second exchange information that indicates information of the exchange where the restaurant has an account. In this case, in the step S32, the control unit 31 acquires the first exchange information from the exchange identification request, and in the step S33, the control unit 31 acquires the second exchange information from the exchange identification request. In addition, the second exchange information D3 may be stored in the storage unit 12, and the exchange identification request may include: the first exchange information that indicates information of the exchange where the user has an account; and the shop identification information. Similarly, the first exchange information D2 may be stored in the storage unit 12, and the exchange identification request may include: the second exchange information that indicates information of the exchange where the restaurant has an account; and the user identification information.

Ninth Embodiment

Figure 15:
FIG. 15 is a diagram showing an example of fee information used in the cryptocurrency payment support system according to an embodiment of the present invention.

Meanwhile, the remittance fee that is required when cryptocurrency is remitted from a user's account to a restaurant's account, may include: a mining fee that is paid to a miner who validates the transaction of the remittance; and a payment fee that is paid to either or both of the remittance source exchange and the remittance source exchange for the transaction of the remittance. Here, FIG. 15 shows fee information D11 that is another example of the fee information D1 (see FIG. 2). As shown in FIG. 15, the fee information D11 includes, as information of fees, the mining fee and the payment fee individually. In the cryptocurrency payment support system 100, a combination of exchanges that requires the lowest fee is identified based on the fee information D11.

Specifically, as a first identification method, when, in the step S35, a combination of exchanges that requires the lowest fee is identified by the control unit 11 of the cryptocurrency payment support apparatus 1, a combination of exchanges that requires the lowest mining fee may be identified based on the fee information D11. This restricts the remittance fee that is paid by the user who is the remitter.

As a second identification method, when a combination of exchanges that requires the lowest fee is identified, a combination of exchanges that requires the lowest payment fee may be identified based on the fee information D11. With this configuration, in a case where the payment fee is paid by the user, it is possible to restrict the remittance fee that is paid by the user. On the other hand, in a case where the payment fee is paid by the restaurant, it is possible to restrict the remittance fee that is paid by the restaurant. Similarly, in a case where the payment fee is shared by the user and the restaurant, it is possible to restrict the remittance fee that is paid by the user and the restaurant.

As a third identification method, when a combination of exchanges that requires the lowest fee is identified, a combination of exchanges that requires the lowest total of the mining fee and the payment fee may be identified based on the fee information D11.

For example, the control unit 11 may be configured to select any one of the first identification method, the second identification method, and the third identification method for each remittance process in accordance with a user operation performed on the shop terminal 2 or the user terminal 3. Of course, any one of the first identification method, the second identification method, and the third identification method may be selected as an initial setting. It is noted that although a case where the combination of exchanges is identified by the control unit 11 of the cryptocurrency payment support apparatus 1 is described here, this also applies to the cases of the above-described embodiments in which the combination of exchanges is identified by the shop terminal 2 or the user terminal 3.

REFERENCE SIGNS LIST 100 cryptocurrency payment support system
1 cryptocurrency payment support apparatus
11 control unit
111 acquisition processing unit
112 identification processing unit
2 shop terminal
21 control unit
211 order processing unit
212 calculation processing unit
213 code generation processing unit
214 output processing unit
3 user terminal
31 control unit
311 reading processing unit
312 payment processing unit
313 acquisition processing unit
314 identification processing unit
315 setting processing unit
35 camera

What is claimed is:

1. A user terminal comprising:
a camera;
a storage unit; and
a control unit comprising a processor, wherein the storage unit stores executable instructions that, when executed by the processor, cause the processor to perform the steps of:
receiving, from a first server of a first exchange, software and storing the received first exchange software in the storage unit;
storing a plurality of cryptocurrency source accounts;
displaying the plurality of source accounts and receiving a selection of one of the displayed source accounts;
scanning, via the camera, a code, wherein the code comprises a charge amount, cryptocurrency amount corresponding to the charge amount and second exchange information comprising information for each of a plurality of second exchanges associated with a destination account;
extracting from the scanned code the charge amount, the cryptocurrency amount and the second exchange information;
generating a first display wherein the first display comprises the charge amount, the cryptocurrency amount, an automatic selection key and a plurality of keys, where each key is for a second exchange of the plurality of second exchanges associated with the destination account;
displaying the first display;
receiving a selection of a key of the plurality of keys, or receiving a selection of the automatic selection key and based on the received selection of the automatic selection key:
executing the first exchange software, and retrieving, from the first server, first exchange information via the executing first exchange software;
transmitting the retrieved first exchange information, the second exchange information and a user id associated with the selected source account, to a second server; and
receiving from the second server a selection of a second exchange of the plurality of second exchanges;
generating a second display, wherein the second display comprises the charge amount, the cryptocurrency amount, an approval key and an address of a second exchange associated with either the received selection of the key or the selection received from the second server;
displaying the second display;
receiving a selection of the approval key and based on the received selection of the approval key,
transmitting, to the second server, a request to remit the cryptocurrency amount from the selected source account to the destination account based on the retrieved first exchange information and the address;
receiving from the second server an indication that the request to remit the cryptocurrency amount from the selected source account to the destination account based on the retrieved first exchange information and the address was executed; and
displaying the received indication.

2. A non-transitory computer-readable recording medium on which is recorded a computer program which, when executed by a computer, causes the computer to perform steps of:
receiving, from a first server of a first exchange, software and storing the received software in a storage unit;
storing a plurality of cryptocurrency source accounts;
displaying the plurality of source accounts and receiving a selection of one of the displayed source accounts;
scanning, via a camera, a code, wherein the code comprises a charge amount, cryptocurrency amount corresponding to the charge amount and second exchange information comprising information for each of a plurality of second exchanges associated with a destination account;
extracting from the scanned code the charge amount, the cryptocurrency amount and the second exchange information;
generating a first display wherein the first display comprises the charge amount, the cryptocurrency amount, an automatic selection key and a plurality of keys, where each key of the plurality of keys is for a second exchange of the plurality of second exchanges associated with the destination account;
displaying the first display;
receiving a selection of a key of the plurality of keys, or receiving a selection of the automatic selection key and based on the received selection of the automatic selection key:
executing the first exchange software, and
retrieving, from the first server, first exchange information via the executing first exchange software;
transmitting the retrieved first exchange information, the second exchange information and a user id associated with the selected source account, to a second server; and
receiving from the second server a selection of a second exchange of the plurality of second exchanges;
generating a second display, wherein the second display comprises the charge amount, the cryptocurrency amount, an approval key and an address of a second exchange associated with either the received selection of the key or the selection received from the second server;
displaying the second display;

receiving a selection of the approval key and based on the received selection of the approval key, transmitting, to the second server, a request to remit the cryptocurrency amount from the selected source account to the destination account based on the retrieved first exchange information and the address;

receiving from the second server an indication that the request to remit the cryptocurrency amount from the selected source account to the destination account based on the retrieved first exchange information and the address was executed; and displaying the received indication.

3. A cryptocurrency support method comprising:

receiving, by a user terminal, from a first server of a first exchange, software and storing, by the user terminal, the received software in a storage unit;

storing, by the user terminal, a plurality of cryptocurrency source accounts;

displaying, by the user terminal, the plurality of source accounts and receiving a selection of one of the displayed source accounts;

scanning, by the user terminal, via a camera, a code, wherein the code comprises a charge amount, cryptocurrency amount corresponding to the charge amount and second exchange information comprising information for each of a plurality of second exchanges associated with a destination account;

extracting, by the user terminal, from the scanned code the charge amount, the cryptocurrency amount and the second exchange information;

generating, by the user terminal, a first display wherein the first display comprises the charge amount, the cryptocurrency amount, an automatic selection key and a plurality of keys, where each key of the plurality of keys is for a second exchange of the plurality of second exchanges associated with the destination account;

displaying, by the user terminal, the first display;

receiving, by the user terminal, a selection of the automatic selection key and based on the received selection of the automatic selection key:

executing, by the user terminal, the first exchange software, and retrieving, by the user terminal, from the first server, first exchange information via the executing first exchange software;

transmitting, by the user terminal, the retrieved first exchange information, the second exchange information and a user id associated with the selected source account, to a second server; and, receiving, by the user terminal, from the second server a selection of a second exchange of the plurality of second exchanges;

generating, by the user terminal, a second display, wherein the second display comprises the charge amount, the cryptocurrency amount, an approval key and an address of a second exchange associated with the selection received from the second server;

displaying, by the user terminal, the second display;

receiving, by the user terminal, a selection of the approval key and based on the received selection of the approval key, transmitting, by the user terminal, to the second server, a request to remit the cryptocurrency amount from the selected source account to the destination account based on the retrieved first exchange information and the address;

receiving, by the user terminal, from the second server an indication that the request to remit the cryptocurrency amount from the selected source account to the destination account based on the retrieved first exchange information and the address was executed; and displaying, by the user terminal, the received indication.

* * * * *